INVENTOR
SEYMOUR R. CRAY

BY Cushman, Darby & Cushman
ATTORNEYS

INVENTOR
SEYMOUR R. CRAY

BY Cushman, Darby & Cushman
ATTORNEYS

INVENTOR
SEYMOUR R. CRAY

BY Cushman, Darby & Cushman
ATTORNEYS

June 26, 1962 S. R. CRAY 3,041,582

MAGNETIC CORE CIRCUITS

Filed Nov. 19, 1956 4 Sheets-Sheet 4

INVENTOR

SEYMOUR R. CRAY

BY Cushman, Darby & Cushman

ATTORNEYS 3,041,582

MAGNETIC CORE CIRCUITS

Seymour R. Cray, Minneapolis, Minn., assignor to Sperry-Rand Corporation, New York, N.Y., a corporation of Delaware Filed Nov. 19, 1956, Ser. No. 623,038
28 Claims. (Cl. 340—174)

This invention relates to magnetic devices which utilize the hysteresis characteristic of magnetic materials as a means for storing and handling information, and more particularly, to circuits and apparatus for determining the state of, or transferring information from such magnetic devices.

The value of small cores of magnetic material for use as storage and logical elements in electronic data handling systems is being increasingly recognized, particularly because of their miniature size, low power requirements, dependability and ability to retain stored information for long periods of time in spite of power failure. These magnetic elements are able to store binary information in the form of static residual magnetization after being momentarily magnetized to saturation in either of two directions. Saturation can be achieved by passing a current pulse through a winding on the magnetic element. Switching is accomplished by applying a current pulse to a winding to create a surge of magnetomotive force in the sense opposite to the pre-existing flux direction, thereby driving the element to saturation in the opposite polarity, provided the magnetomotive force exceeds a certain critical value and is applied in the direction opposite to the original residual flux direction of the second element. On the other hand, a magnetizing pulse applied to the first element which drives it further into saturation in the same direction produces a change in flux which is small compared to that created in reversing its polarity and hence induces a voltage in its output winding that is smaller than the minimum required to switch the second element.

In order to achieve a good ratio between the output from the first element when it is driven to the opposite polarity as compared to its output in driving it to saturation in its original polarity, the magnetic material of the element is preferably one having a generally rectangular hysteresis characteristic so that the residual flux density is a relatively large percentage of the flux density present during the application of a saturating magnetomotive force. A number of suitable magnetic materials are available such as "Mumetal," "Permalloy," and ferromagnetic ferrites. In order to improve high frequency response by reducing eddy current losses, "Mumetal" and "Permalloy" are preferably used in thin strips which may be wrapped around miniature spools while ferrite elements may be molded and windings placed directly thereon, inasmuch as ferrites are relatively free from eddy current effects.

Accordingly it is a prime object of this invention to provide improved magnetic devices for storing and handling information.

Another object is to provide magnetic devices which operate with a constant voltage driving source rather than a constant current driving source.

A further object is to provide magnetic devices which switch at a constant voltage.

A still further object is to provide in magnetic devices a switching action which is a function of a limiting voltage.

Still another object of this invention is to provide magnetic devices in which the logical function of negation is effected during the same electrical impulse period as an information transfer.

Still another object of this invention is to provide a magnetic device with a sneak pulse suppressor which prevents the insertion of false information into said magnetic device.

A still further object of this invention is to provide magnetic devices in a logical network which switch under no-load conditions.

Another object of this invention is the provision of a circuit operating as the function of a limited voltage for determining the state of a saturable magnetic core device.

Yet another object of this invention is the provision of a transfer circuit operating at constant voltage when transferring information from one magnetic device to a second magnetic device.

Another object of this invention in conjunction with the preceding object is the provision of a negation circuit operative at constant voltage to oppose transfer of information depending upon the state of the magnetic device used in the negation circuit.

A further object of this invention is the provision of logical networks utilizing magnetic core devices operating at constant voltage during the transfer of information therefrom.

A still further object of this invention is the provision of a magnetic core register in which information may be shuttled between two magnetic core devices operable at constant voltage during the shuttling of information.

Another object of this invention in conjunction with the preceding object is the provision of a magnetic gating element operable at constant voltage to gate information from the register.

Another object of this invention is the provision of a magnetic device for erasing information circulating in a magnetic core register operating at constant voltage.

Another object of this invention is the provision of a magnetic core device operable at constant voltage for introducing information into a magnetic core register.

Other objects and advantages of this invention will become obvious to those of ordinary skill in the art by reference to the following detailed description of exemplary embodiments of the apparatus and the appended claims. The various features of the exemplary embodiments may be best understood with reference to the following drawings, wherein:

FIGURE 1 illustrates voltage waveforms which can be expected during an information detection or transfer involving a large or substantial voltage impulse output;

FIGURE 1*a* illustrates voltage waveforms which can be expected during an information detection or transfer involving a small or insubstantial voltage impulse output;

Figures 2, 4:
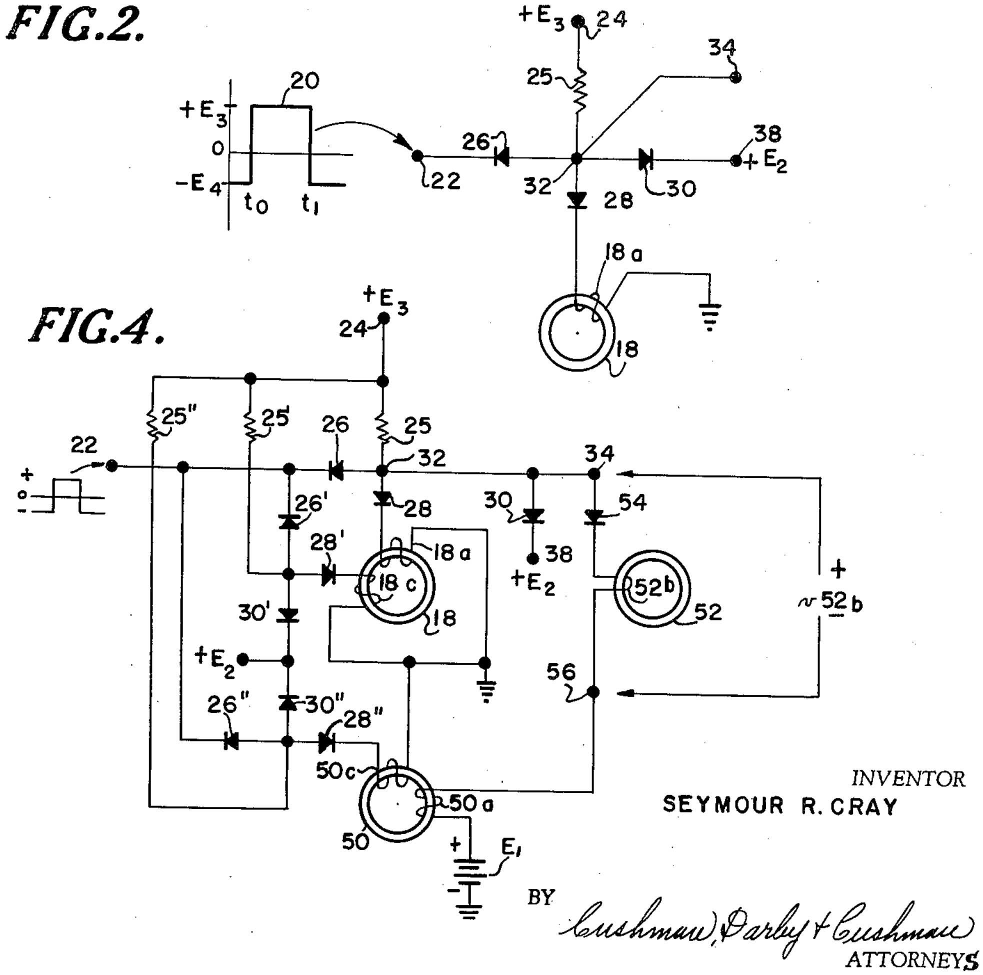
FIGURE 2 illustrates a detection or switching circuit in accordance with this invention.
FIGURE 4 illustrates magnetic devices of this invention forming the logical function of AND–NOT in a single electrical impulse period.
Figure 7:
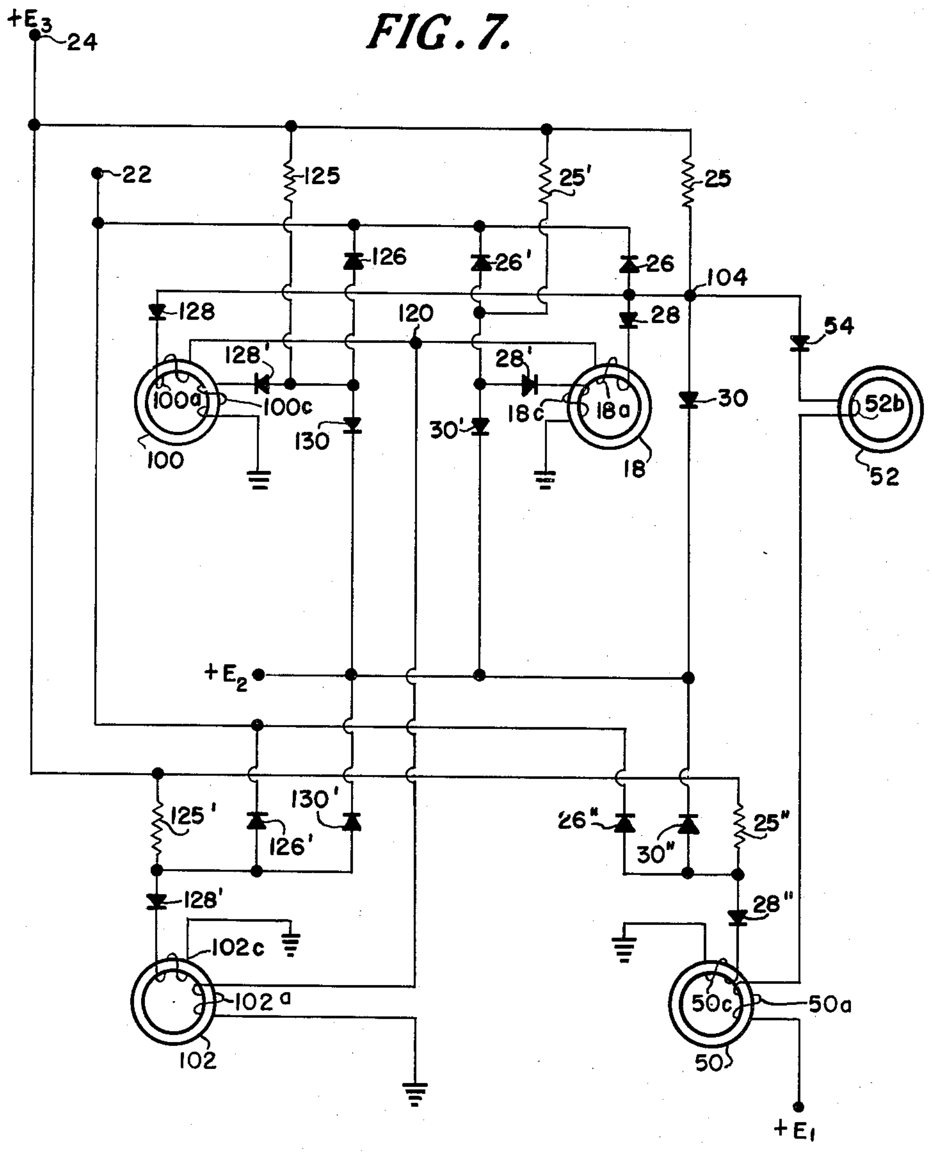
Figure 8:
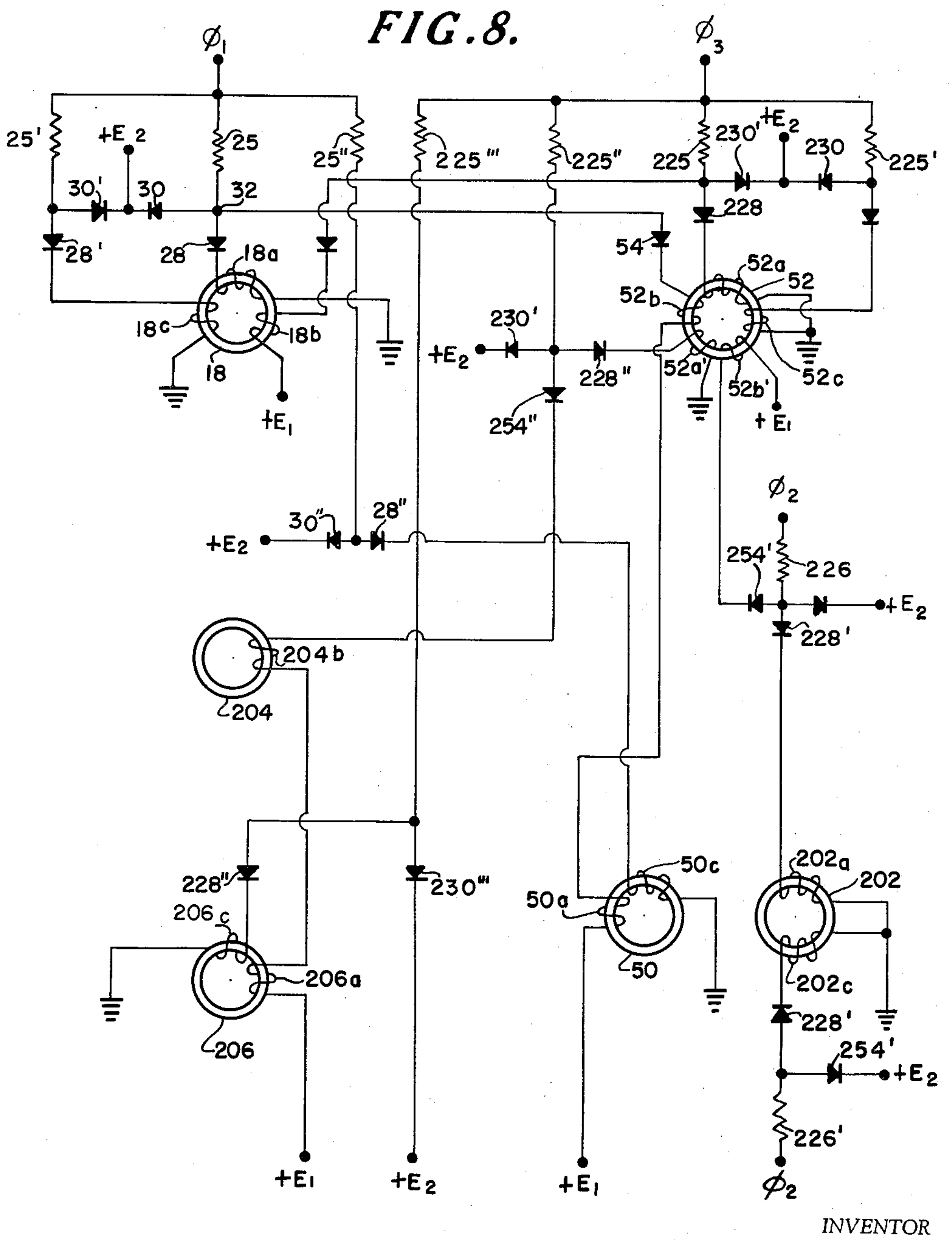

FIGURES 6, 6*a*, 6*b* and 6*c* illustrates idealized waveforms from the circuit in FIGURE 4 for various states of remanent magnetization of the magnetic cores containing information;

FIGURE 7 illustrates magnetic devices of this invention forming the logical function of AND–OR–NOT in a single electrical impulse period, and FIGURE 8 illustrates magnetic devices of this invention forming a bit register with an input and a gated output.

Figure 1:
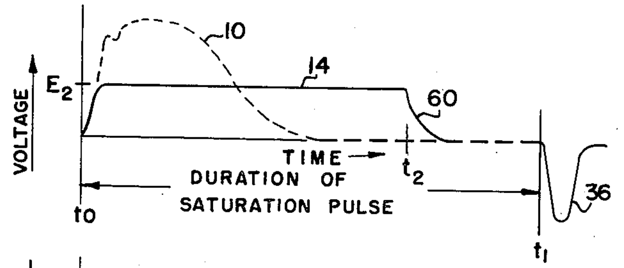

When magnetic material is magnetized to saturation in the direction opposite to that of its initial residual magnetization, a voltage waveform is induced in every winding on that element as shown by the dotted line 10 of FIGURE 1. If the magnetic material is magnetized to saturation so that it does not change state, the induced voltages take the form of the doted line 12 in FIGURE 1*a*. The relative amplitudes of these two waveforms depend upon the squareness of the systeresis characteristic of the magnetic material, the number of turns in a winding, and the current waveforms. By using diodes to limit the amplitudes of the voltages thus induced, the waveforms may take generally rectangular shapes as shown by the solid lines 14 and 16, respectively, of FIGURES 1 and 1*a*, the increased time coordinate being due to the extension of the switching time by clamping action. The reason for the increased time coordinate is that the voltage-time integral describing the switching action is a constant for magnetic devices. To insure reliable operation the saturating pulse is designed to be longer, i.e., from time $t_0$ to time $t_1$ in FIGURE 1, than the time $t_0$ to $t_2$ required for switching at a given voltage.

Figure 1A:
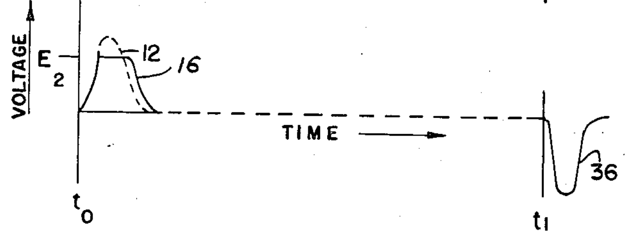
Figure 3:
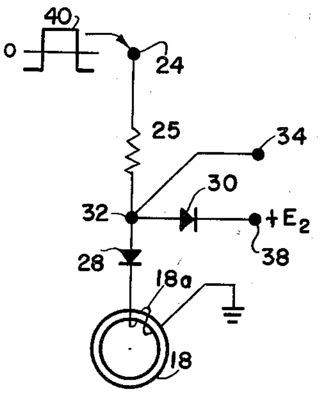
FIGURE 3 illustrates a modification of the circuit of FIGURE 2.

FIGURES 2 and 3 illustrate circuits whereby saturable magnetic core elements may be magnetized to saturation to induce across every winding on said core elements a voltage having a waveform shown by the solid line 14 or 16 of FIGURES 1 and 1*a* depending upon the initial remanent magnetization. The circuits of FIGURES 2 and 3 may be utilized to determine the remanent or initial state of core 18 or to transfer information therefrom as to the state thereof to subsequent circuits as hereafter described. In FIGURE 2, prior to time $t_0$ of waveform 20, terminal 22 is held at negative potential $E_4$, the starting voltage of waveform 20. Therefore, because of a steady voltage $E_3$ at terminal 24, current flows through resistor 25 and diode 26 to terminal 22, the current paths through diodes 28 and 30 being of higher impedance. Junction 32, and therefore terminal 34, is therefore clamped substantially at the negative potential $E_4$ by diode 26, thereby causing diodes 28 and 30 to be nonconductive.

It is to be understood that the ground symbol used in the drawings refers to a common connection which is at zero potential with the other positive and negative potentials being in reference thereto. Therefore, the pulse applied at terminal 22 is effectively between ground and terminal 22 with the imposition of a negative potential $E_4$.

Between times $t_0$ and $t_1$ diode 26 is made non-conductive by the application of voltage wave 20 to terminal 22; the current flowing through resistor 25 then divides between diodes 28 and 30 as soon as the voltage at junction 32 becomes greater than the positive clamping voltage $E_2$ connected to terminal 38. The portion of the current thereby allowed to flow through diode 28 is just eufficient to induce voltage $E_2$ across winding 18*a*, which may be termed an output winding, the voltage drop across diode 28 being comparatively negligible since the forward impedance thereof is low. Diode 30 provides clamping action at voltage $E_2$. The voltage $E_3$ at terminal 24 in effect then provides an interrogating signal across winding 18*a* when the lower impedance path through diode 26 is blocked. The interrogating signal forces element 18 to a state of remanent magnetization, arbitrarily referred to as positive, by the magnetomotive force created by the signal causing a current through winding 18*a*. The current in output winding 18*a* must be sufficient to switch the magnetic element in the time allotted by voltage wave 20.

Referring again to FIGURE 1, the waveform represented by solid line 14 is a typical voltage pattern to be expected across output winding 18*a* and at terminal 34 when element 18 changes from one polarity of remanent magnetization to the other, i.e., when it shifts from a first remanent state (positive or negative) to a second remanent state. This may conveniently be termed a binary "1" output. This output appears each time the magnetic core prior to the detection period or the switching action is magnetically polarized in a first direction or state arbitrarily defined as "set." The waveform represented by the solid line 16 in FIGURE 1*a* is a typical voltage pattern to be expected across output winding 18*a* and at junction 32 when element 18 during the switching action does not shift but remains at its original polarity of remanent magnetization. This is similarly termed a "0" output. This output occurs each time the magnetic core prior to the detection period or the switching action is magnetically polarized in a second remanent state or direction arbitrarily defined as "cleared."

The small positive voltage pulse 12 of FIGURE 1*a* near time $t_0$ is caused by the transition from remanent magnetization toward saturation magnetization in the same polarity. The negative voltage pulse 36 in FIGURES 1 and 1*a* after time $t_1$ is caused by the return of the magnetic core to the remanent magnetic state. Since this circuit can change the magnetic state of element 18 in only one direction, the voltage at terminal 34 when element 18 changes state will always be more positive than at any other time. This positive voltage at terminal 34 may be applied to a second element as hereinafter described.

The circuit illustrated in FIGURE 3 operates similarly to that of FIGURE 2 with diode 26, terminal 22, and steady voltage $E_3$ of FIGURE 2 being eliminated. A wave 40 of preferably the same shape as voltage wave 20 of FIGURE 2 but with capability of providing an interrogating signal across winding 18*a* of FIGURE 3 so as to cause a saturating current therein, is applied to terminal 24 between time $t_0$ and $t_1$ instead of voltage $E_3$. As before, the current through resistor 25 divides between diodes 28 and 30 when the voltages to diode 30 allow forward conduction therethrough. The same waveforms are induced across winding 18*a* in FIGURE 3 as in FIGURE 2; thus, the output voltage at terminal 34 remains the same. Advantages of the circuit of FIGURE 3 are that the power duty factor of resistor 25 is reduced, thereby reducing power consumption, and that fewer components are necessary. Resistor 25 of FIGURE 3 also provides isolation between the drive circuits and the diodes (which are preferably semi-conductor devices).

In applying the switching action of FIGURES 2 and 3 to logical networks, the circuit appears as a current switch. When a magnetic core shifts state and generates a sizable E.M.F. in its output winding, the current flowing through resistor 25 is switched away from the output winding 18*a* to another winding termed an input winding located on a second magnetic core. When no magnetic shift occurs, the output winding appears as a low impedance and the current is switched through the output winding to ground, preventing current from flowing in the input winding of said second element.

FIGURE 4 illustrates how the circuits of FIGURES 2 or 3 may be applied to perform a simple logical operation in data processing equipment. If magnetic core 18 changes state and magnetic core 50 does not change state upon receipt of an input to terminal 22, a current will flow in input winding 52*b* which is sufficient to force magnetic core 52 to the magnetic polarity arbitrarily designated as "set." This action is termed a conditional "set," that is, conditional on the previous magnetic states of elements 18 and 50.

When a voltage impulse is applied to terminal 22, diodes 26, 26′, and 26″ are made non-conductive. The switching action as described for FIGURE 2 now occurs. Current from voltage $E_3$ at terminal 24 flows through windings 18*a*, 18*c* and 50*c* to switch elements 18 and 50. Windings designated by a number and the letter "*a*" are output windings; windings designated by a number and the letter "*b*" are input windings, and windings designated by a number and the letter "*c*" are "assist" or "help" windings which are hereinafter described. When element 18 changes state, junction 34 becomes positive tending to make diode 54 conductive, thereby causing current to flow in winding 52*b* and "set" core 52. Core 50 has its output winding 50*a* in series with input winding 52*b*. As a result of current flowing in winding 50*c*, when its diode 26″ is blocked by a signal at terminal 22, a potential of the same magnitude and duration as the positive potential at junction 34 is induced in winding 50*a* so as to be additive to the positive supply voltage $E_1$. Therefore, diode 54 will remain non-conductive since voltage $E_1$ plus the E.M.F. in winding 50*a* is more than the potential of junction 34. When element 50 changes state, it prevents magnetic core 52 from being set by a current, which may be termed a transfer current, produced during the switching action of element 18. This function may be termed "negation."

Figure 6:
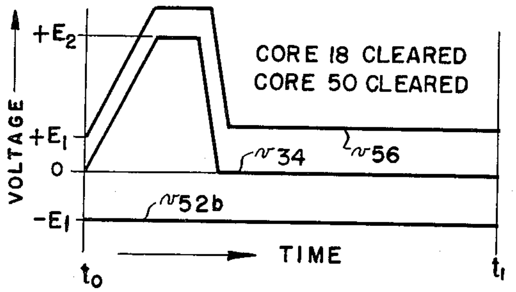
Figure 6A:
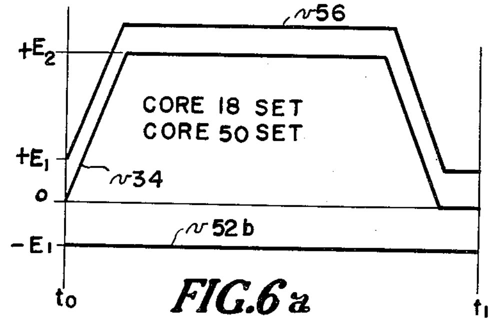
Figure 6B:
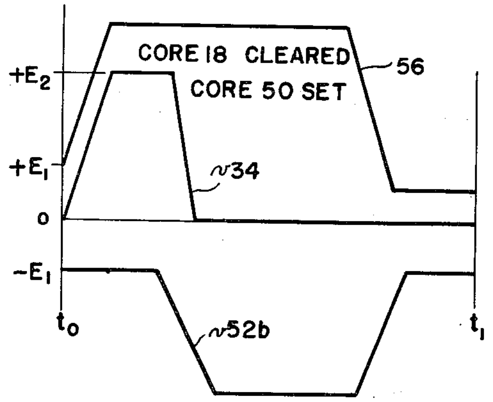
Figure 6C:
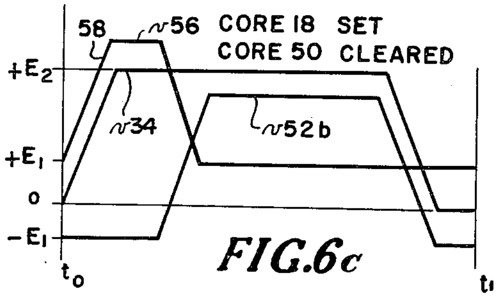

The coaction of elements 18 and 50 may be better understood with reference to the idealized waveforms illustrated in FIGURES 6 to 6*c*. By arbitrary definition when a core undergoes a change of state because of the switching action of the circuit of FIGURES 2 or 3, that core was previously "set" and is "cleared" after the switching action. Waveform $v_{34}$ represents the potential to ground at junction 34 of FIGURE 4 and waveform $v_{56}$ represents the voltage at junction 56 to ground, while waveform $v_{52b}$ represents the voltage across winding 52*b* and diode 54. This latter voltage is determined by the difference between the voltages of the former waves. When elements 18 and 50 are both "set" or both "cleared" previous to the transfer, voltage $v_{52b}$ is essentially constant; that is, it is equal in magnitude to positive bias voltage $E_1$ as shown in FIGURES 6 and 6*a*. This bias voltage $E_1$ is represented as a negative voltage as it opposes any current which flows through diode 54 and which tends to force element 52 to the magnetic state defined as "set." When core 18 is "cleared" and core 50 is "set" prior to transfer a more negative voltage appears across winding 52*b* as shown in FIGURE 6*b*. With the above mentioned conditions it is obvious to those of ordinary skill in the art that diode 54 is cut off and that no current flows in winding 52*b*, since the voltage of waveform $v_{52b}$ as it appears across diode 54 for the situations of FIGURES 6, 6*a* and 6*b* is always negative.

FIGURE 6*c* illustrates the idealized waves which are associated with the circuit of FIGURE 4 when element 52 becomes "set." The voltage of waveform $v_{52b}$ becomes positive only after the zero or sneak impulse 58 of core 50 subsides. A current flows in winding 52*b* only when the voltage of waveform $v_{52b}$ is positive causing diode 54 to conduct. This current which may be termed a transfer current must be of sufficient magnitude and duration to force element 52 to change state.

With reference again to FIGURE 4, windings 18*c* and 50*c*, as previously mentioned, are "assist" or "help" windings. The switching action of these windings is similar to the switching action of winding 18*a*. Windings 18*c* and 50*c* function in their assist sense during the switching period and insure the complete switching of their respective cores at a constant voltage. It will be apparent that these windings are in parallel to their respective output windings 18*a* and 50*a*. When a pulse is applied at terminal 22 so as to prevent the currents through resistors 25, 25′, and 25″ from passing through their respective diodes 26, 26′, 26″, the switching period begins. Since winding 25*b* has fewer turns than winding 18*a*, core 52 switches before core 18. After core 52 switches, winding 52*b* presents a low impedance to the interrogating current present at junction 32, and a large portion of the interrogating current is, therefore, diverted through diode 54 and away from winding 18*a*. The E.M.F. induced across winding 18*a* begins to fall below the clamping voltage $E_2$ as at 60 in FIGURE 1. Thus, without assist winding 18*c*, core 18 would not be completely switched. With winding 18*c* assisting in switching core 18, the diversion of current from junction 34 by winding 52*b* does not prevent complete switching of core 18. During the initial part of the switching period, both windings 18*a* and 18*c* contribute to the switching, while during the later part of the switching period, winding 18*c* completes the switching of core 18 by itself.

Current through winding 50*c* provides the switching of core 50 as no current is flowing through diode 54, winding 52*b*, or winding 50*a* during negation. If core 50 is initially cleared, then transfer current flows downward from junction 34 through winding 50*a*.

It is to be understood that cores 18 and 52 can operate in the circuit of FIGURE 4 without the "assist" functions provided by windings 18*c* and 50*c*. However, it is preferable to utilize assist windings when a transfer or logical operation is to be performed, since thereby more reliable operation is obtained in that complete switching of all participating magnetic devices is assured. Of course, when negation core 50 is employed, an assist winding such as winding 50*c* is necessary to switch the core.

It is apparent that with or without winding 18*c* and its associated circuitry and without the negation portion of the circuit of FIGURE 4 (i.e., without core 50 and its windings and associated diode circuitry), but with junction 56 connected directly to ground, that there remains a circuit with which information may be transferred to core 52 from core 18 upon the receipt of an interrogation signal to winding 18*a*. That is, upon current passing through winding 18*a*, a substantial voltage is induced across this winding if the impedance thereof is at this time high (i.e., if core 18 is set), so that consequent voltage at junction 34 to ground is sufficient to change the state of core 52 if the state thereof is changeable. By the same token if the impedance of winding 18*a* is low (i.e., if core 18 is cleared), when an interrogating signal is pressed across the winding, the voltage at junction 34 to ground will be insubstantial and insufficient to shift core 52.

In addition, it will be apparent that the circuit of FIGURE 4 may operate like the circuit of FIGURE 3 if an impulse voltage rather than a steady signal is applied to terminal 24. Under such a mode of operation, diodes 26, 26′ and 26″ along with their connections to terminal 22 may be eliminated. The operation of the circuit otherwise is the same as heretofore explained.

Figure 5:
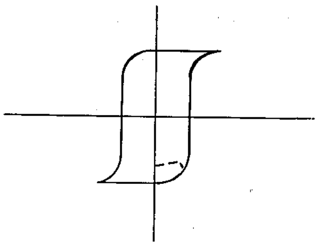
FIGURE 5 illustrates the effect of the sneak signal of FIGURE 1*a* on the hysteresis loop of a magnetic core.

Magnetic core 50 may also be used as a "0" or "sneak" signal suppressor. FIGURE 1*a* illustrates the voltage wave associated with the circuit of FIGURES 2 and 3 when the magnetic core does not change state during application of an electrical impulse. The current (known as a "0" or "sneak" signal) flowing in set winding 52*b* of element 52 as a result of an interrogation signal to winding 18*a* which does not switch core 18, is insufficient to cause switching of core 52, but may cause the element to traverse a minor hysteresis loop, such as the one shown partially in dotted lines in FIGURE 5. If several of such signals are received from winding 18*a* and applied successively to set winding 52*b*, core 52 may be undesirably shifted from the cleared to the set magnetic state. This inserts false information into the data processing system. By placing the output winding of magnetic core 50 in series circuit with set winding 52*b*, a similar "0" signal induced in winding 50*a* by the small current flow through diode 28″ opposes and prevents the sneak signal generated by element 18 from producing a small current in set winding 52*b*. With the sneak suppressor, complete quiescence is insured.

Utilizing the invention, FIGURE 7 illustrates a logical "AND-OR-NOT" circuit in that magnetic core 52 will be set upon application of a voltage impulse to terminal 22 if magnetic core 50 is cleared and if either core 102 is set or both of cores 100 and 18 are set. The operation of cores 18, 50 and 52 and their associated circuitry is the same as that explained in relation to FIGURE 4. "AND" core 100 has its output winding 100*a* coupled via diode 128 and junction 120 in parallel with diode 28 and winding 18*a*, the output of both cores 18 and 100 being referenced to voltage $E_2$ by diode 30. "OR" core 102 is arranged similarly to core 50 but has its output winding 102*a* connected in series at junction 120 with the output windings of both "AND" cores 18 and 100. Windings 100*c* and 102*c* are "assist" windings in the sense heretofore described. Since the output windings 18*a* and 100*a* are in parallel, the voltage at junction 104 is comparatively low if either or both of cores 18 and 100 are not shifted from a set state to a cleared state by an application of a voltage impulse to terminal 22. Therefore, it is apparent that the circuits including cores 18 and 100 form a logical "AND" circuit whereby core 52 is shifted only when both cores 18 and 100 are previously in their set states.

In addition, FIGURE 7 illustrates an "OR" circuit. Winding 102*a* of core 102 is in series with windings 18*a* and 100*a*. Either of cores 18 and 100 may form an "OR" circuit with core 102. Considering either winding 18*a* or winding 100*a* by itself or in parallel circuit with each other along with winding 102*a*, it will be apparent that the voltage induced in winding 102*a* by current flowing through winding 102*c* upon application of the voltage impulse to terminal 22 will be in addition to any voltage induced in windings 18*a* and 100*a*. Therefore, if core 102 is initially in a set state, or if both cores 18 and 100 are in a set state, or if all cores 18, 100, and 102 are in a set state, the voltage at junction 104 will be comparatively high. However, if either of cores 18 or 100 is in a cleared state and core 102 is in a cleared state, the voltage at junction 104 will be comparatively low. The circuit of FIGURE 7 thus far explained as to cores 18, 100, and 102 provides a logical "AND-OR" circuit with core 102 along with either of cores 18, 100 alone being an "OR" circuit. To extend the circuit so as to include a logical "NOT" circuit, the core 50 and its associated circuitry may be added as in the manner previously explained. It will be understood, however, that the negation core 50 may be utilized in combination with cores 18 and 100 as a parallel circuit alone, or in combination with core 102 alone to determine the transfer current in winding 52*b*. Generally speaking, it may be said that for any logical network in parallel with an input winding, each output winding or combination of output windings in series with other output windings or combinations thereof form a logical "OR" circuit with said other output windings. Similarly, any output windings or combinations thereof in parallel with other output windings or combinations thereof form a logical "AND" circuit with said other output windings. Any output windings or combinations thereof in series with an input winding form a logical negation which is satisfied when a positive voltage appears across such a series network.

It is apparent, of course, that the alternate driving technique illustrated in FIGURE 3 may be used in the circuit of FIGURE 7 as well as the driving technique of FIGURE 2. That is, instead of providing a steady signal at terminal 24, a voltage impulse may be presented thereto in such a manner that an interrogating signal is present across windings 18*a*, 18*c*, 100*a*, 100*c*, 50*c*, and 102*c* without the aid of terminal 22 and connecting diodes 26, 26′, 26″, 126 and 126′.

FIGURE 8 of this invention illustrates the use of the alternate driving technique of FIGURE 3 for forming a bit register with one input and a gated output. Although the register is illustrated as using the driving system of FIGURE 3, it will be understood that the driving system of FIGURE 2 may also be utilized. The basic bit register includes cores 18 and 52 with output windings 18*a* and 52*a* and input windings 18*b* and 52*b*. The register operates with a multi-phase clock system. During each of the different phase-times a separate non-overlapping pulse occurs and is designated in FIGURE 8 in accordance with its sequence of occurrence. For example, the first pulse is designated $\phi_1$, the second pulse $\phi_2$ and the third pulse $\phi_3$. The information in the register is shuttled between cores 18 and 52 by application of pulse $\phi_1$ to winding 18*a* in the manner heretofore explained, and by pulse $\phi_3$ to winding 52*a* through resistor 225 and diode 228. If upon recurrence of pulse $\phi_1$, core 18 is in a set state, a substantial output will occur across winding 18*a* so that core 52 may be shifted to a set state if it is not already therein. The substantial output across winding 18*a* is limited in amplitude to the amplitude of voltage $E_2$ in the matter heretofore explained. Upon the application of pulse $\phi_3$, similar substantial output limited in amplitude to voltage $E_2$ is present across winding 52*a* if core 52 is in a set state. The pulse $\phi_3$ will switch core 52 to a cleared state and transfer the information from the core back to core 18 via winding 18*b* by shifting said core back to its set state. Of course, if both cores 18, 52 are in their cleared states originally, presentation of pulses $\phi_1$ and $\phi_3$ will be to no avail in the shifting of either core. In this state the register upon being pulsed may be said to be shifting a "0," whereas when the cores are shifted from one state to another, the register may be thought of as circulating a "1."

Whenever it is desired to stop the circulation of a "1" in the register, it is only necessary to utilize core 50 and its associated circuitry. This core acts in a manner similar to the foregoing cores which had windings connected in series with an input winding. That is, the core acts as in a negation sense in that upon presentation of pulse $\phi_1$, a "1" may not be transferred from core 18 to core 52 if pulse $\phi_1$ also causes shift of core 50 so as to provide a back E.M.F. from winding 50*a* whereby diode 54 is cut off. In this matter, circulation of a "1" not only may be prevented, but in effect the circuit provides for the circulation of a "0."

In formation may be inserted into the bit register via either core 18 or 52 and in the illustration of FIGURE 8, the information is inserted through input winding 52*b*′. This winding is connected through diodes 228′ and 254′ to the output winding 202*a* on an input core 202. Winding 202*a* is also connected to a pulse $\phi_2$ through resistor 226 so that the state of core 202 upon presentation of pulse $\phi_2$ determines whether information is inserted into core 52. Core 202 may carry an assist winding 202*c* with associated circuitry in the manner heretofore described. New information is preferably inserted into the register by stopping circulation of information within the register by suitably setting the state of core 50 (by means not shown) before pulse $\phi_1$. Then, before pulse $\phi_2$, core 202 is changed (by means not shown) to the remanence state necessary for inserting the information via winding 52*b*′ when pulse $\phi_2$ occurs. When pulse $\phi_3$ occurs, a transfer of information from core 52 to core 18 will take place.

For determining the contents of the bit register, an output winding may be placed on either of cores 18 or 52. In the illustration of FIGURE 8, core 52 has a second output winding 52*a*′. This winding is coupled through diode 228″ and resistor 225″ to the interrogating signal providing means. An output core 204 with its input winding 204*b* is coupled to the output winding 52*a*′ by diode 254″. Therefore, upon presentation of pulse $\phi_3$ the output winding 52*a*′ will provide a substantial output of voltage $E_2$ if the register is circulating a "1" so that the current through winding 204*b* will shift core 204. FIGURE 8 additionally illustrates a negation circuit in connection with output winding 52*a*′, which circuit may be referred to as a magnetic gate. Winding 204*b* is in series with an output winding 206*a* on the gating saturable magnetic core element 206. The winding 206*a* is also connected in series with a biasing supply voltage $E_1$. The input and assist winding 206*c* on core 206 is coupled through diode 228‴ and resistor 225‴ through the source providing pulse $\phi_3$, and is referenced to voltage $E_2$ by diode 230‴. In operation, a substantial output from winding 52*a*′ shifts core 204 only if pulse $\phi_3$ did not also cause core 206 to shift and provide a back E.M.F. in opposition to the E.M.F. of winding 52a'. The gating function accomplished by core 206 and its associated circuitry may also be accomplished with other logical circuits herein described; for example, the "AND" circuit of FIGURE 7 may be used.

It is to be understood that the reference herein to "saturable magnetic core elements" is intended to include any saturable magnetic element whether in toroidal core form or in film form as long as the hysteresis characteristics thereof are suitable for the practice of this invention. Additionally, the use of the term "winding" or the phrase "winding means" includes, where applicable, a conductor forming at least one turn about a magnetic element as by the mere passage of the conductor once through a toroidal core, or alternatively by the disposition of a conductor merely in proximity to a magnetic element so as to cause the desired effects.

Thus it is apparent that there is provided by this invention systems in which various phases, objects and advantages herein set forth are successfully achieved.

Modifications of this invention not described herein will become apparent to those of ordinary skill in the art. Therefore, it is intended that the matter contained in the foregoing description and the accompanying drawings be interpreted as illustrative and not limitative, the scope of the invention being defined in the appended claims.

What is claimed is:

1. Apparatus for transferring information from a first bistable saturable magnetic core element to a second bistable saturable magnetic core element in accordance with the remanent state of the first element comprising said first and second elements, first winding means on said first element and second winding means on said second element, means intercoupling said first and second winding means, means for supplying at least one signal, and means for applying said signal electrically to the first winding means including a single limiting circuit means for limiting said signal and any resulting output of the first winding means to a predetermined maximum amplitude as they appear across said first winding means, the arrangement being such that when the first core element is in a first state, said signal causes at least partial shift of said first element to a second state and provides a substantial output of substantially said predetermined amplitude for shifting said second core element to a predetermined state if said second element is not already therein, whereas when the first core element is in said second state said signal causes no shift of either of said core elements.

2. Apparatus for transferring information from a first bistable saturable magnetic core element to a second bistable saturable magnetic core element in accordance with the remanent state of the first element comprising said first and second elements, first winding means on said first element and second winding means on said second element, means electrically intercoupling said first and second winding means, means coupled electrically to said first winding means for providing an interrogating signal thereto including a single limiting circuit means for limiting said signal and any resultant output of the first winding means to a predetermined maximum amplitude as they appear across said first winding means, the arrangement being such that when the first core element is in a first state, said interrogating signal causes at least partial shift thereof to a second state and provides through said intercoupling means a substantial output having an amplitude of substantially said predetermined amplitude for shifting said second core element to a predetermined state if said second element is not already therein, whereas when the first core element is in said second state the presence of said interrogating signal causes no shift of either of said core elements.

3. Apparatus as in claim 2 and further including third winding means on said first core element and means for electrically coupling said third winding means to the interrogating signal providing means whereby the first core element is assuredly fully shifted to said second state and the amplitude of said substantial output remains substantially constant for a time substantially as long as the full duration of said first element shift.

4. Apparatus as in claim 2 wherein said interrogating signal provides a zero signal from the first winding means when the first core element is in said second state prior to receipt of said interrogating signal, and wherein the apparatus further includes means for suppressing said zero signal.

5. Apparatus as in claim 2 and further including a third bistable saturable magnetic core element, said intercoupling means including third winding means on said third core element in series with said second winding means, fourth winding means on said third core element and means coupling said fourth winding means to the interrogating signal providing means, the arrangement being such that information is transferred to the second winding means for shifting said second core element only when said third core element is not shifted when an interrogating signal is presented to said first winding means.

6. Apparatus as in claim 5 and further including fifth winding means on said first core element and means for coupling said fifth winding means to the interrogating signal providing means whereby the first core element is assuredly fully shifted to said second state and the amplitude of said substantial output remains substantially constant for a time substantially as long as the full duration of said first element shift.

7. Apparatus as in claim 2 and further including third and fourth winding means respectively on said first and second core elements, means for electrically intercoupling said third and fourth winding means, means coupled electrically to said fourth winding means for providing a second interrogating signal thereto at a time different than the time occurrence of the first mentioned interrogating signal, and means for limiting the second interrogating signal to a given amplitude across said fourth winding means, the arrangement being such that when the second core element is in said predetermined state, said second interrogating signal causes at least partial shift thereof to another state, and provides to said third winding means a substantial output having an amplitude of substantially said given amplitude for shifting said first core element to its said first state if it is not already therein, whereas when the second core element is already in said another state the presence of said second interrogating signal causes no substantial output signal and no shift of either of the said core elements.

8. Apparatus as in claim 7 and further including assist winding means on each of said first and second core elements, and means for coupling said assist winding means to said signal providing means respectively, whereby the amplitude of the substantial outputs from both said first and fourth winding means remains substantially constant for a time substantially as long as the duration of any shift of their respective core elements.

9. Apparatus for transferring information from a first saturable magnetic core element to a second saturable magnetic core element in accordance with the remanent state of the first element comprising said first and second elements, first winding means on said first element and second winding means on said second element, means intercoupling said first and second winding means, means for providing an interrogating signal to said first winding means including a single limiting circuit means for limiting said signal and any resultant output of the first winding means to a predetermined maximum amplitude as they appear across said first winding means, the arrangement being such that when the first core element is in a first state, said interrogating signal causes shift thereof to a second state and provides through said intercoupling means a substantial output having an amplitude of substantially said predetermined amplitude at least during said shift for shifting said second core element to a predetermined state, if said second element is not already therein, whereas when the first core element is in said second state the presence of said interrogating signal causes no shift of either of said core elements, and further including a third saturable magnetic core having third winding means thereon connected in parallel with said first winding means to said interrogating signal providing means and in series with said second winding means, the arrangement being such that information is transferred to said second core element only when both said first and third core elements are in a predetermined remanent state when an interrogating signal is presented to said first and third winding means.

10. Apparatus as in claim 9 and further including fourth winding means on said first core element and fifth winding means on said third core element and means for coupling said fourth and fifth winding means to the interrogating signal providing means whereby the first core element is assuredly fully shifted to said second state and the amplitude of said substantial output remains substantially constant for a time substantially as long as the full duration of any shift of said first and third elements.

11. Apparatus as in claim 9 and further including a fourth bistable magnetic core element having fourth and fifth winding means thereon, said fourth winding means being connected in series with both said first and third winding means, said fifth winding means being coupled to said interrogating signal providing means, the arrangement being such that information is transferred to said second core element only when said first core element and either of the third and fourth core elements are in a predetermined remanent state when an interrogating signal is presented to said first, third, and fifth winding means.

12. Apparatus as in claim 9 and further including a fourth bistable magnetic core element, said intercoupling means including fourth winding means on the fourth core element in series with said second winding means, fifth winding means on the fourth core element, and means coupling the fifth winding means to the interrogating signal providing means, the arrangement being such that information is transferable to said second core element only when said fourth core element is not shifted when an interrogating signal is received.

13. Apparatus as in claim 12 and further including a fifth bistable magnetic core element, said intercoupling means including sixth winding means on said fifth core element in series with said second winding means, seventh winding means on the fifth core element, and means coupling the seventh winding means to the interrogating signal providing means, the arrangement being such that information is transferable to said second core element only when said fifth core element is not shifted when an interrogating signal is received.

14. Apparatus as in claim 13 and further including eighth and ninth winding means respectively on said first and third core elements, and means for coupling said eighth and ninth winding means to the interrogating signal providing means whereby the first and third core elements may be assuredly shifted to their respective second states if shiftable by the receipt of an interrogating signal regardless of any tendency of the first and third cores to stop short of full shift by the effect of an interrogating signal received by said first and third winding means.

15. Apparatus for transferring information from a first saturable magnetic core element to a second saturable magnetic core element in accordance with the remanent state of the first element comprising said first and second elements, first winding means on said first element and second winding means on said second element, means intercoupling said first and second winding means, means for providing an interrogating signal to said first winding means including a single limiting circuit means for limiting said signal and any resultant output of the first winding a third winding means on said first core element and appear across said first winding means, the arrangement being such that when the first core element is in a first state, said interrogating signal causes shift thereof to a second state and provides through said intercoupling means a substantial output having an amplitude of substantially said predetermined amplitude at least during said shift for shifting said second core element to a predetermined state, if said second element is not already therein, whereas when the first core element is in said second state the presence of said interrogating signal causes no shift of either of said core elements, and further including a third saturable magnetic core element having third and fourth winding means thereon, said third winding means connected in series with said first winding means, said fourth winding means being coupled to said interrogating signal providing means, the arrangement being such that information is transferred to said second core element if either said first or third core elements is in a high impedance state when said interrogating signal is presented to said first and fourth winding means.

16. Apparatus as in claim 15 and further including fifth winding means on said first core element and means for coupling said fifth winding means to the interrogating signal providing means whereby the first core element is assuredly fully shifted to said second state and the amplitude of said substantial output remains substantially constant for a time substantially as long as the full duration of any shift of said first or third core elements.

17. Apparatus as in claim 15 and further including a fourth bistable magnetic core element, said intercoupling means including fifth winding means on the fourth core element in series with said second winding means, sixth winding means on the fourth core element and means coupling the fifth winding means to the interrogating signal providing means, the arrangement being such that information is transferable to said second core element only when said fourth core element is not shifted when an interrogating signal is received.

18. Apparatus for transferring information from a first bistable saturable magnetic core element to a second bistable saturable magnetic core element in accordance with the remanent state of the first element comprising said first and second elements, first winding means on said first element and second winding means on said second element, means including a junction for coupling said first and second winding means, first unidirectional means in the coupling means for connecting said first winding means to the junction, a source of reference potential, second unidirectional means coupling said source to the junction to form with said source a maximum amplitude signal limited circuit, and means for providing an interrogating signal directly to said junction, the arrangement being such that when the first core element is in a first state said interrogating signal causes at least partial shift thereof to a second state and provides through said junction a substantial output having a voltage corresponding to said reference potential for shifting said second core element to a predetermined state if said second element is not already therein, whereas when the first core element is in said second state the presence of said interrogating signal causes no shift of either of said core elements.

19. Apparatus as in claim 18 and further including a third winding means on said first core element and means for coupling said third winding means to the interrogating signal providing means whereby the first core element is assuredly fully shifted and the voltage of said substantial output remains constant substantially as long as said shift.

20. Apparatus for transferring information to a first bistable saturable magnetic core element in accordance with the respective remanent states of second and third bistable saturable magnetic core elements comprising said first, second and third elements, first, second and third winding means respectively on said elements, means including a junction for coupling said first and second winding means, first unidirectional means in the coupling means for connecting said second winding means to the junction, means interconnecting said second and third winding means, a source of reference potential, second unidirectional means coupling said source to the junction, means for providing an interrogating signal directly to said junction, and means including fourth winding means on said third core element for coupling said third element to the interrogating signal providing means, the arrangement being such that said first core element shifts to a predetermined state if not already therein when said interrogating signal causes at least partial shift of only said second core element and provides a substantial output from the second winding means, a shift in said third core element being such as to oppose shift in said first core element.

21. Apparatus as in claim 20 wherein said fourth winding means is unidirectionally coupled to the interrogating signal providing means and to said source of reference potential, said third and fourth winding means on the third core element being polarized such that when said second and third core elements are in a state so as not to be shifted by the presence of said interrogating signal, insubstantial outputs from said second winding means and said third winding means oppose each other and prevent any signal in said first winding means.

22. Apparatus as in claim 21 and further including assist winding means on said second core element, and means for coupling said assist winding means to the interrogating signal coupling means, whereby the voltage of said substantial output remains constant substantially as long as the duration of the shift of said second core element.

23. Apparatus for transferring information from a first saturable magnetic core element to a second saturable magnetic core element in accordance with the remanence state of the first element comprising said first and second elements, first winding means on said first element and second winding means on said second element, said first and second winding means being interconnected in a transfer circuit, means for applying a transfer signal voltage across two points of said transfer circuit, the arrangement being such that when the first core element is in a first remanence state, current resulting from said applied transfer signal voltage by generation of m.m.f. in said first winding means itself causes shift of said first element to a second state and in so doing causes sufficient current flow through the second winding means to shift the second core element to a predetermined state if said second element is not already therein, but when the first core element is in said second state action of current resulting from said applied transfer signal voltage in the first winding means is ineffective to shift either of said core elements, said transfer circuit including two unidirectional devices connected serially in opposite senses one on each side of one of said two points in the transfer circuit, and further including voltage limiting means coupled to said transfer circuit for maximally limiting the voltage of said transfer signal voltage and the resultant voltage causing said current to flow through the second winding means.

24. Apparatus for transferring information from a first saturable magnetic core element to a second saturable magnetic core element in accordance with the remanent state of the first element comprising said first and second elements, first winding means on said first element and second winding means on said second element, means intercoupling said first and second winding means, means for providing an interrogating signal to said first winding means including a single limiting circuit means for limiting said signal and any resultant output of the first winding means to a predetermined maximum amplitude as they appear across said first winding means, the arrangement being such that when the first core element is in a first state, said interrogating signal causes shift thereof to a second state and provides through said intercoupling means a substantial output having an amplitude of substantially said predetermined amplitude at least during said shift for shifting said second core element to a predetermined state, if said second element is not already therein, whereas when the first core element is in said second state the presence of said interrogating signal causes no shift of either of said core elements, and further including third and fourth winding means respectively on said first and second core elements, means for electrically intercoupling said third and fourth winding means, means coupled electrically to said fourth winding means for providing a second interrogating signal thereto at a time different than the time occurrence of the first mentioned interrogating signal, and means for limiting the second interrogating signal to a given amplitude across said fourth winding means, the arrangement being such that when the second core element is in said predetermined state, said second interrogating signal causes at least partial shift thereof to another state, and provides to said third winding means a substantial output having an amplitude of substantially said given amplitude for shifting said first core element to its said first state if it is not already therein, whereas when the second core element is already in said another state the presence of said second interrogating signal causes no substantial output signal and no shift of either of the said core elements, and further including a third saturable magnetic core element having fifth and sixth winding means thereon, said fifth winding means being part of the means intercoupling said first and second winding means, and means coupling said sixth winding means to the first interrogating signal providing means, the arrangement being such that said second core element is shifted by a substantial output from said first winding means only if said third core element is not shifted upon the receipt by said sixth winding means of the first interrogating signal.

25. Apparatus for transferring information from a first saturable magnetic core element to a second saturable magnetic core element in accordance with the remanent state of the first element comprising said first and second elements, first winding means on said first element and second winding means on said second element, means intercoupling said first and second winding means, means for providing an interrogating signal to said first winding means including a single limiting circuit means for limiting said signal and any resultant output of the first winding means to a predetermined maximum amplitude as they appear across said first winding means, the arrangement being such that when the first core element is in a first state, said interrogating signal causes shift thereof to a second state and provides through said intercoupling means a substantial output having an amplitude of substantially said predetermined amplitude at least during said shift for shifting said second core element to a predetermined state, if said second element is not already therein, whereas when the first core element is in said second state the presence of said interrogating signal causes no shift of either of said core elements, and further including third and fourth winding means respectively on said first and second core elements, means for electrically intercoupling said third and fourth winding means, means coupled electrically to said fourth winding means for providing a second interrogating signal thereto at a time different than the time occurrence of the first mentioned interrogating signal, and means for limiting the second interrogating signal to a given amplitude across said fourth winding means, the arrangement being such that when the second core element is in said predetermined state, said second interrogating signal causes at least partial shift thereof to another state, and provides to said third winding means a substantial output having an amplitude of substantially said given amplitude for shifting said first core element to its said first state if it is not already therein, whereas when the second core element is already in said another state the presence of said second interrogating signal causes no substantial output signal and no shift of either of the said core elements, and further including fifth winding means on said second core element, means coupling said fifth winding means to the second signal providing means, an output bistable magnetic core element having input winding means thereon coupled to said fifth winding means, a gating bistable magnetic saturable core element having output winding means thereon connected to the input winding means of said output element, said gating element having sixth winding means coupled to the second signal providing means, and amplitude limiting means coupled to the said fifth, sixth, and input winding means for limiting the signals thereacross, the arrangement being such that upon presentation of said second signal to the fifth winding means, an output therefrom is provided to shift said output core element if said second signal did not at the same time cause shift of said gating element whereby the output of said output winding means opposes the output of said fifth winding means.

26. Apparatus for transferring information from a first saturable magnetic core element to a second saturable magnetic core element in accordance with the remanent state of the first element comprising said first and second elements, first winding means on said first element and second winding means on said second element, means intercoupling said first and second winding means, means for providing an interrogating signal to said first winding means including a single limiting circuit means for limiting said signal and any resultant output of the first winding means to a predetermined maximum amplitude as they appear across said first winding means, the arrangement being such that when the first core element is in a first state, said interrogating signal causes shift thereof to a second state and provides through said intercoupling means a substantial output having an amplitude of substantially said predetermined amplitude at least during said shift for shifting said second core element to a predetermined state, if said second element is not already therein, whereas when the first core element is in said second state the presence of said interrogating signal causes no shift of either of said core elements, and further including third and fourth winding means respectively on said first and second core elements, means for electrically intercoupling said third and fourth winding means, means coupled electrically to said fourth winding means for providing a second interrogating signal thereto at a time different than the time occurrence of the first mentioned interrogating signal, and means for limiting the second interrogating signal to a given amplitude across said fourth winding means, the arrangement being such that when the second core element is in said predetermined state, said second interrogating signal causes at least partial shift thereof to another state, and provides to said third winding means a substantial output having an amplitude of substantially said given amplitude for shifting said first core element to its said first state if it is not already therein, whereas when the second core element is already in said another state the presence of said second interrogating signal causes no substantial output signal and no shift of either of the said core elements, and further including an input bistable saturable magnetic core element having output winding means thereon, input winding means on one of said first and second core elements, and means coupled to said output winding means for providing a third interrogating signal including means for limiting the amplitude of the third signal to said predetermined amplitude across said output winding means, said third interrogating signal when occurring being between said first and second signals, the arrangement being such that upon receipt of said third signal, said output winding means provides a substantial output to said input winding means if said input core element is shifted thereby.

27. Apparatus as in claim 26 and further including assist winding means on said input core element and means for coupling said assist winding means to the third interrogating signal providing means whereby the amplitude of the output from said output winding means remains substantially constant for a time substantially as long as the duration of any shift of said input core element.

28. Apparatus for determining the state of a bistable saturable magnetic core element comprising winding means on said element, means coupled electrically and non-inductively to the winding means for providing an indicative output, means coupled electrically and non-inductively to said winding means for providing an interrogating signal thereto including a single limiting circuit for limiting both said signal and said output to a predetermined maximum amplitude as they appear across the winding means, the arrangement being such that when the core element is in a first state said signal causes at least partial shift of the core element to a second state and provides a substantial output indicative of said first state, said substantial output having an amplitude of substantially said predetermined amplitude, whereas when the core element is in said second state, said signal causes no shift of the core element and provides no substantial output, and further including second winding means on said core element and means for coupling said second winding means to the interrogating signal providing means whereby the element is assuredly fully shifted to said second state and the voltage of said substantial output remains substantially constant for a time as long as the full duration of said shift.

References Cited in the file of this patent

UNITED STATES PATENTS

| | | |
|---|---|---|
| 2,683,819 | Rey | July 13, 1954 |
| 2,741,758 | Cray | Apr. 10, 1956 |
| 2,747,110 | Jones | May 22, 1956 |
| 2,753,545 | Lund | July 3, 1956 |
| 2,776,380 | Andrews | Jan. 1, 1957 |
| 2,805,409 | Mader | Sept. 3, 1957 |
| 2,812,448 | Kaufman | Nov. 5, 1957 |
| 2,846,593 | Sands | Aug. 5, 1958 |
| 2,846,669 | McMillan | Aug. 5, 1958 |
| 2,861,259 | Meyerhoff | Nov. 18, 1958 |
| 2,892,998 | Eckert et al. | June 30, 1959 |